United States Patent
Gulati et al.

(10) Patent No.: US 11,764,935 B2
(45) Date of Patent: Sep. 19, 2023

(54) OPEN LOOP CLUTTER INTERFERENCE MITIGATION

(71) Applicant: QUALCOMM Incorporated, San Diego, CA (US)

(72) Inventors: Kapil Gulati, Belle Mead, NJ (US); Andrzej Partyka, Bedminster, NJ (US); Navid Abedini, Somerset, NJ (US); Junyi Li, Chester, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/169,134

(22) Filed: Feb. 5, 2021

(65) Prior Publication Data
US 2021/0250158 A1  Aug. 12, 2021

Related U.S. Application Data

(60) Provisional application No. 62/971,897, filed on Feb. 7, 2020.

(51) Int. Cl.
*H04L 5/14* (2006.01)
*H04L 43/16* (2022.01)
*H04L 5/00* (2006.01)

(52) U.S. Cl.
CPC .............. *H04L 5/14* (2013.01); *H04L 5/0048* (2013.01); *H04L 43/16* (2013.01)

(58) Field of Classification Search
CPC .......... H04L 5/14; H04L 5/0048; H04L 43/16
(Continued)

(56) References Cited

U.S. PATENT DOCUMENTS

2016/0309466 A1* 10/2016 Chen ..................... H04L 5/0023
2018/0097599 A1*  4/2018 Lee ..................... H04W 72/042
(Continued)

FOREIGN PATENT DOCUMENTS

CN        107017933 A  *  8/2017  ........... H04B 7/0854
CN        108811074 A  * 11/2018  ........... H04L 5/0048
(Continued)

OTHER PUBLICATIONS

CATT: "Beam Management for Control and Data Channel", 3GPP Draft, 3GPP TSG RAN WG1 Meeting #88, R1-1702076, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 12, 2017 (Feb. 12, 2017), XP051209237, 4 Pages, Retrieved from the Internet: URL:http://www.3gpp.org/ftp/Meetings_3GPP_SYNC/RAN1/Docs/ [retrieved on Feb. 12, 2017] paragraphs [02. 1] , [02. 2].

(Continued)

*Primary Examiner* — Rownak Islam
(74) *Attorney, Agent, or Firm* — Norton Rose Fulbright US LLP

(57) ABSTRACT

In one aspect, a method for wireless communication includes transmitting, by a wireless communication device, symbol configuration information for a particular transmission time interval (TTI). The symbol configuration information indicates one or more subsets of symbols of the particular TTI, and the wireless communication device is operating in a full duplex mode. The method for wireless communication further includes transmitting, by the wireless communication device, Quasi-Colocation (QCL) information for one or more subsets of the symbols, where the QCL information indicates multiple QCL per TTI. Other aspects and features are also claimed and described.

29 Claims, 9 Drawing Sheets

800 — Transmit symbol configuration information for a particular transmission time interval (TTI), the symbol configuration information indicating one or more subsets of symbols of the particular TTI, wherein the wireless communication device is operating in a full duplex mode.

801 — Transmit Quasi-Colocation (QCL) information for one or more subsets of the symbols, wherein the QCL information indicates multiple QCL per TTI.

(58) Field of Classification Search
USPC .......................................................... 370/280
See application file for complete search history.

(56) References Cited

U.S. PATENT DOCUMENTS

2020/0014515  A1      1/2020   Qin et al.
2020/0322932  A1*    10/2020   Kim ................... H04W 72/042

FOREIGN PATENT DOCUMENTS

| WO | WO-2016033978 A1 * | 3/2016 | ............... H04B 7/26 |
| WO | WO-2018201495 A1 | 11/2018 | |
| WO | WO-2019143173 A1 | 7/2019 | |

OTHER PUBLICATIONS

International Search Report and Written Opinion—PCT/US2021/016970—ISA/EPO—dated May 3, 2021.

* cited by examiner

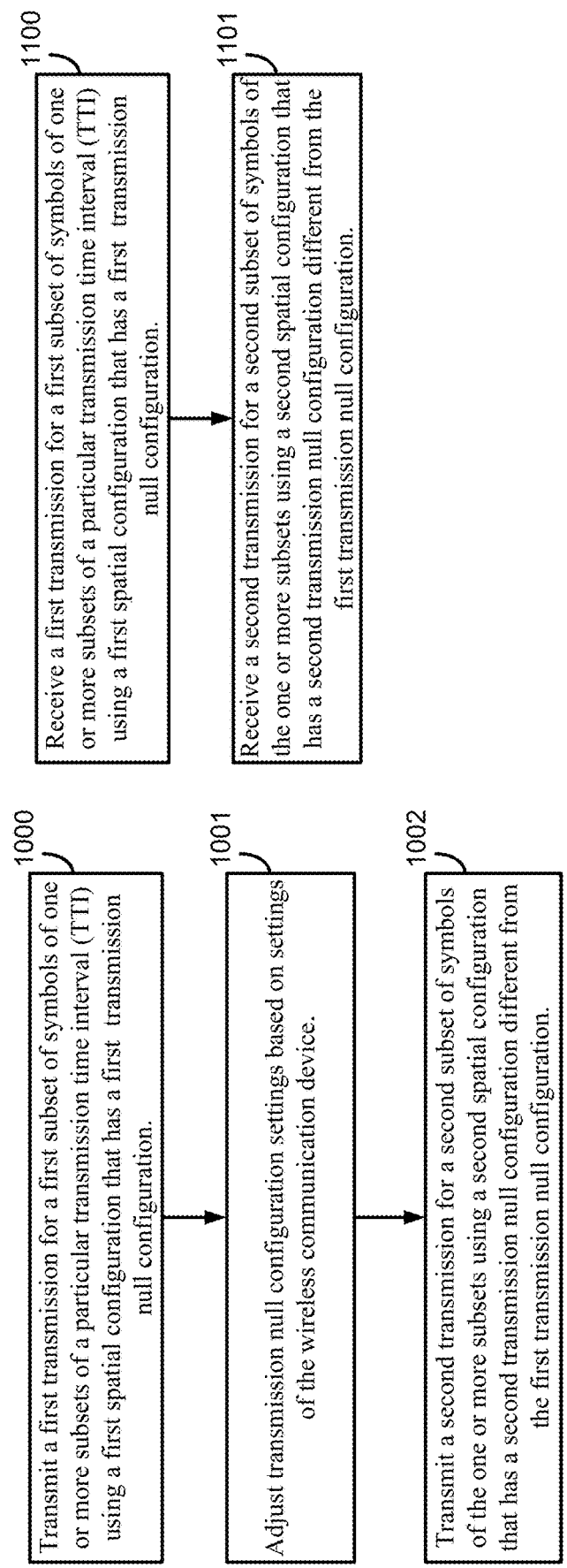

OPEN LOOP CLUTTER INTERFERENCE MITIGATION

CROSS-REFERENCE TO RELATED APPLICATIONS

This application claims the benefit of U.S. Provisional Patent Application No. 62/971,897, entitled, "OPEN LOOP CLUTTER INTERFERENCE MITIGATION," filed on Feb. 7, 2020, which is expressly incorporated by reference herein in its entirety.

TECHNICAL FIELD

Aspects of the present disclosure relate generally to wireless communication systems, and more particularly, to interference mitigation. Certain embodiments of the technology discussed below can enable and provide open loop clutter interference mitigation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on all of the downlink, uplink, and sidelink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes transmitting, by a wireless communication device, symbol configuration information for a particular transmission time interval (TTI), the symbol configuration information indicating one or more subsets of symbols of the particular TTI, wherein the wireless communication device is operating in a full duplex mode; and transmitting, by the wireless communication device, Quasi-Colocation (QCL) information for one or more subsets of the symbols, wherein the QCL information indicates multiple QCL per TTI.

In an additional aspect of the disclosure, an apparatus configured for wireless communication includes means for transmitting, by a wireless communication device, symbol configuration information for a particular transmission time interval (TTI), the symbol configuration information indicating one or more subsets of symbols of the particular TTI, wherein the wireless communication device is operating in a full duplex mode; and means for transmitting, by the wireless communication device, Quasi-Colocation (QCL) information for one or more subsets of the symbols, wherein the QCL information indicates multiple QCL per TTI.

In an additional aspect of the disclosure, a non-transitory computer-readable medium having program code recorded thereon. The program code includes code to transmit, by a wireless communication device, symbol configuration information for a particular transmission time interval (TTI), the symbol configuration information indicating one or more subsets of symbols of the particular TTI, wherein the wireless communication device is operating in a full duplex mode; and to transmit, by the wireless communication device, Quasi-Colocation (QCL) information for one or more subsets of the symbols, wherein the QCL information indicates multiple QCL per TTI.

In an additional aspect of the disclosure, an apparatus configured for wireless communication is disclosed. The apparatus includes at least one processor, and a memory coupled to the processor. The processor is configured to transmit, by a wireless communication device, symbol configuration information for a particular transmission time interval (TTI), the symbol configuration information indicating one or more subsets of symbols of the particular TTI, wherein the wireless communication device is operating in a full duplex mode; and to transmit, by the wireless communication device, Quasi-Colocation (QCL) information for one or more subsets of the symbols, wherein the QCL information indicates multiple QCL per TTI.

In an additional aspect of the disclosure, a method of wireless communication includes transmitting, by a wireless communication device, a first transmission for a first subset of symbols of one or more subsets of a particular transmission time interval (TTI) using a first spatial configuration that has a first transmission null configuration; adjusting, by the wireless communication device, transmission null configuration settings based on settings (e.g., predetermined null weight sweeping pattern) of the wireless communication device; and transmitting, by the wireless communication device, a second transmission for a second subset of symbols of the one or more subsets using a second spatial configuration that has a second transmission null configuration different from the first transmission null configuration.

In an additional aspect of the disclosure, a method of wireless communication includes simultaneously transmitting and receiving, by a wireless communication device, data; performing, by the wireless communication device, open loop clutter interference; and simultaneously transmitting and receiving, by the wireless communication device, second data based on the open loop clutter interference mitigation.

In an additional aspect of the disclosure, a method of wireless communication includes receiving, by a wireless communication device, symbol configuration information for a particular transmission time interval (TTI), the symbol configuration information indicating one or more subsets of symbols of the particular TTI, wherein the wireless communication device is operating in a full duplex mode; and receiving, by the wireless communication device, Quasi-Colocation (QCL) information for one or more subsets of the symbols, wherein the QCL information indicates multiple QCL per TTI.

In an additional aspect of the disclosure, an apparatus configured for wireless communication is disclosed. The apparatus includes at least one processor, and a memory coupled to the processor. The processor is configured to receive, by a wireless communication device, symbol configuration information for a particular transmission time interval (TTI), the symbol configuration information indicating one or more subsets of symbols of the particular TTI, wherein the wireless communication device is operating in a full duplex mode; and to receive, by the wireless communication device, Quasi-Colocation (QCL) information for one or more subsets of the symbols, wherein the QCL information indicates multiple QCL per TTI.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 10 is a block diagram illustrating another example of blocks executed by a UE.

FIG. 11 is a block diagram illustrating another example of blocks executed by a network entity.

DETAILED DESCRIPTION

Figure 1:
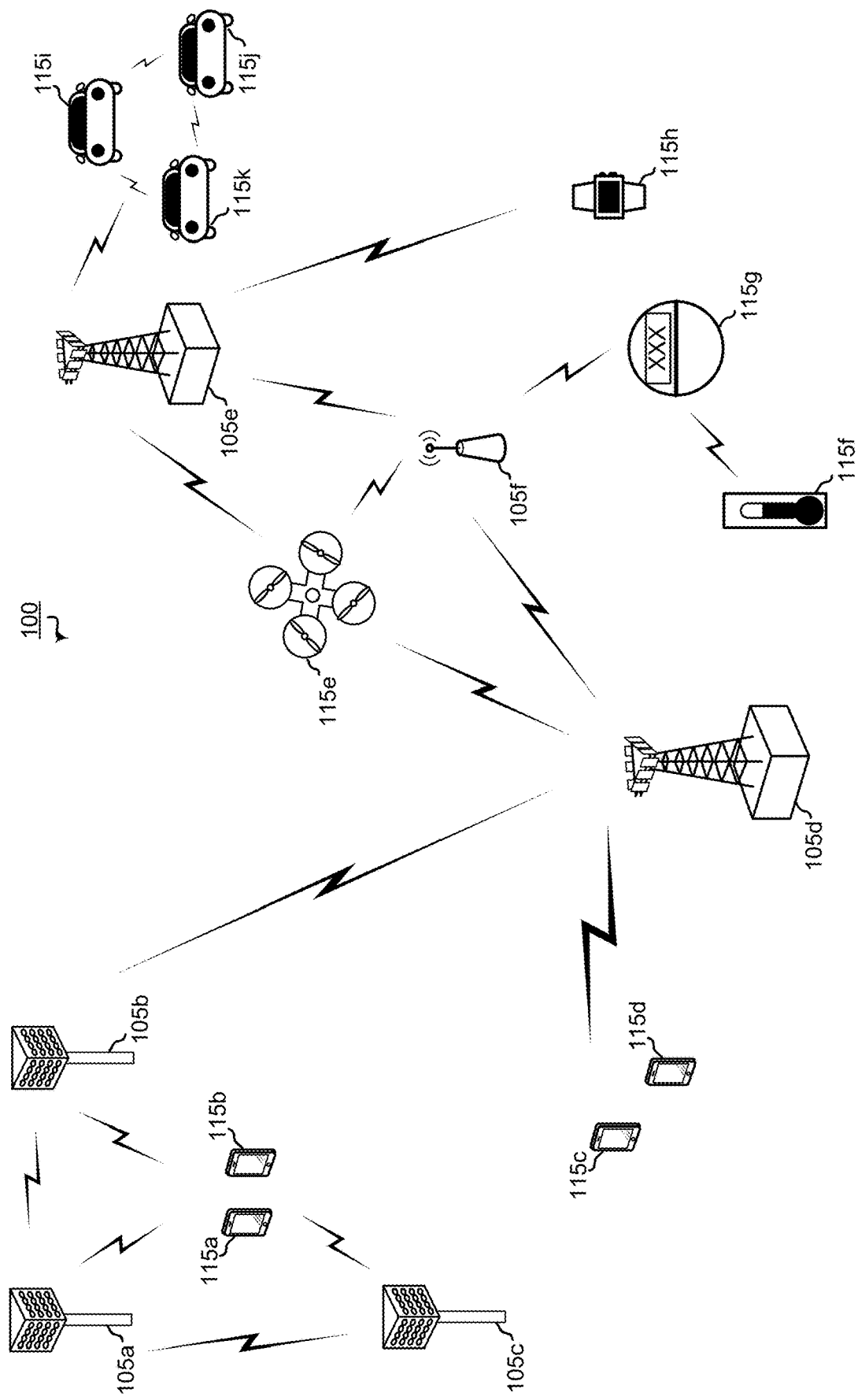
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

Transmission Time Interval (TTI) is a parameter related to encapsulation of data from higher layers into frames for transmission on the radio link layer. TTI may refer to the duration of a transmission on the radio link. TTI may be defined as the inter-arrival time of TBS (Transport Block Set), and is equal to the periodicity at which a Transport Block Set is transferred by the physical layer on the radio interface. TTI may be a multiple of the minimum interleaving period (e.g. 10 ms, the length of one RF (Radio Frame)). A higher layer (e.g., the Medium Access Control (MAC) layer) may deliver one Transport Block Set to the physical layer every TTI. Within each transmission time interval (TTI), corresponding to one subframe of length 1 ms, up to two transport blocks of dynamic size may be delivered to the physical layer and transmitted over the radio interface for each component carrier in some implementations.

In some implementations, TTI duration corresponds to a number of consecutive symbols for one transmission in the time domain. The combination of one numerology and one TTI duration may determine how transmission is made on physical layer. The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
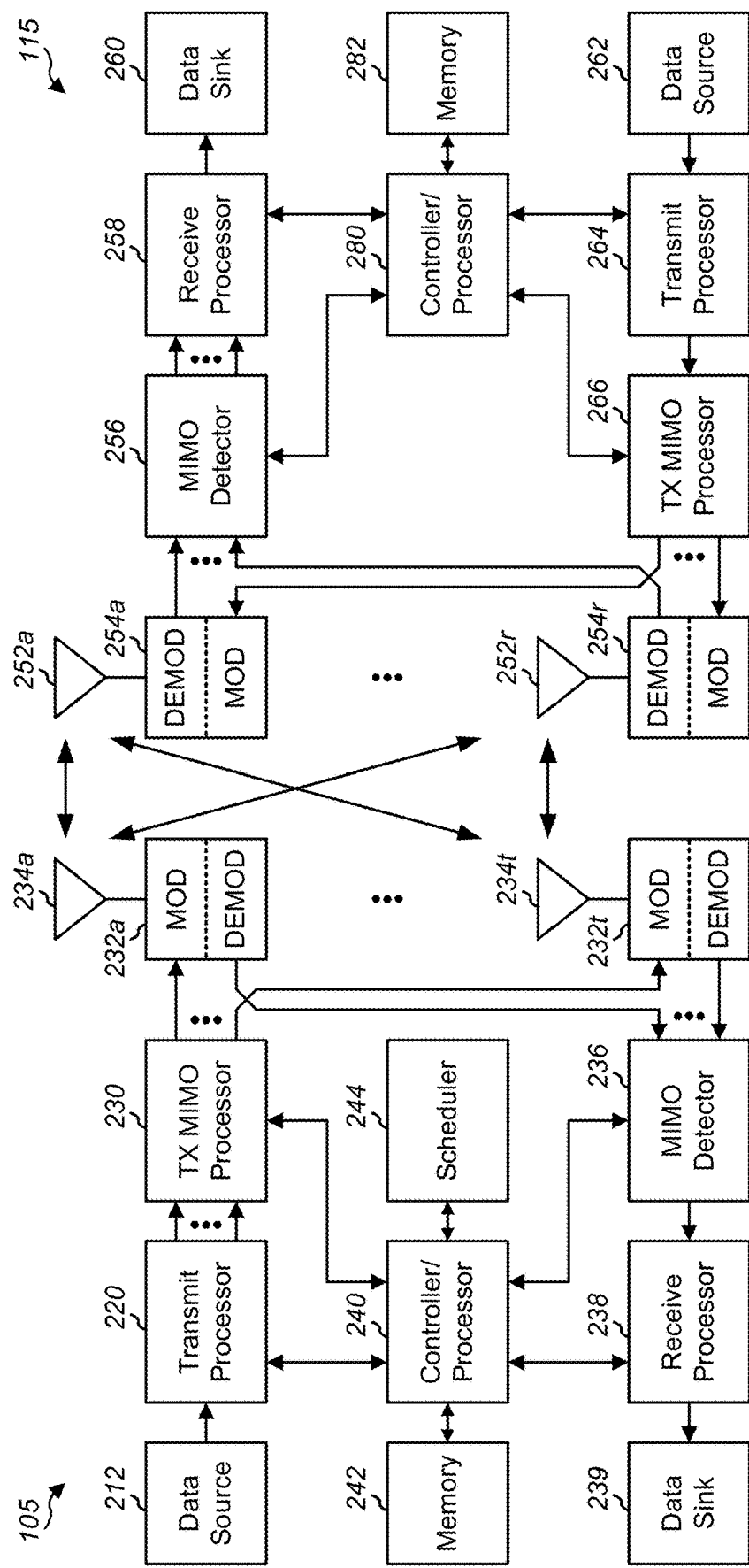
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 8 and 9, and/or other processes for the techniques described herein. Memories 242 and 282 may store data and program codes for base station 105 and UE 115, respectively. Scheduler 244 may schedule UEs for data transmission on the downlink, uplink, and/or sidelink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3B:
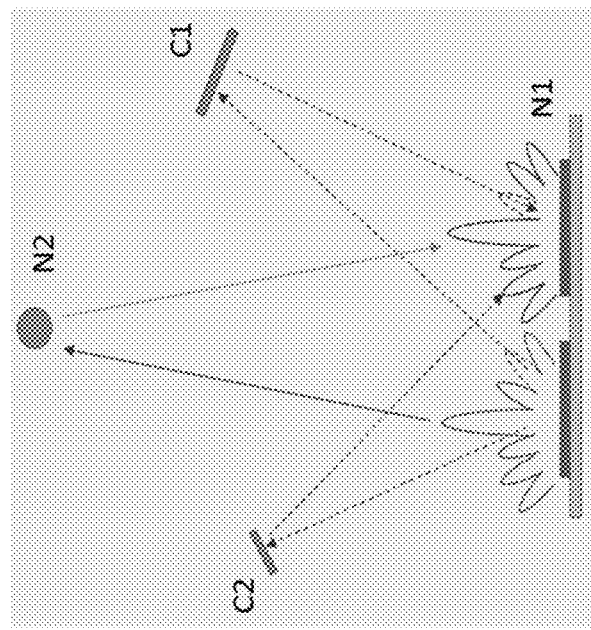
FIGS. 3A and 3B are diagrams illustrating examples of antenna arrays.
Figure 3A:
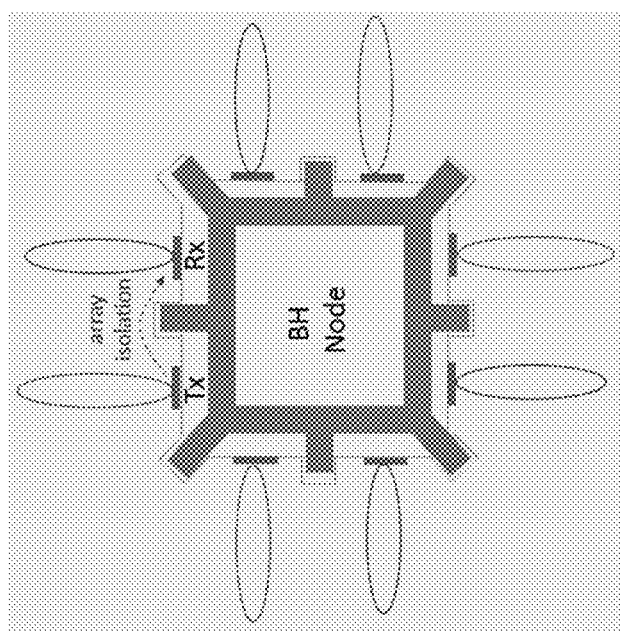

Referring to FIGS. 3A and 3B, examples of antenna arrays are illustrated. FIG. 3A corresponds to a diagram illustrating a complex antenna array. The antenna array may be suitable for mm wave communications, full duplex operations (e.g., simultaneous transmission and reception), or both. In the example of FIG. 3A, the antenna array has transmission (TX) and reception/receiving (RX) antenna panels or elements that are separated and isolated from each other. To illustrate, the antenna panels are spaced apart from each other and have structure blocking a transmission path between the two antenna panels. In some implementations and operating modes, a pair of TX and RX antenna panels/elements may simultaneously transmit and receive data, such as at least partially overlapping in time, frequency, or both.

FIG. 3B corresponds to a diagram illustrating simultaneous operation and clutter interference on one side of the antenna array of FIG. 3A. In FIG. 3B, the antenna elements of the TX and/or RX antenna panels form transmission nulls to reduce interference. Transmission nulls correspond to an intentional suppression of an antenna response in one or more particular directions, such as reduced, low, or no energy sidelobes. As illustrated in FIG. 3B, the antenna array of node N1 is operating in a full duplex mode with node N2. Outgoing and incoming transmissions have a particular main direction (e.g., spatial direction) or focus of radiative energy from the antennas. To produce such a main direction (e.g., spatial angle), the antenna panel also emits sidelobes or radiative energy in additional directions fanning out from the main direction. This sidelobe energy may cause interference. As shown in the example of FIG. 3B, the sidelobe energy or signals may reflect off of objects, such as C1 and C2. When reflected transmission sidelobe energy is directed back at the RX antenna panel, which is active to receive an RX transmission, the transmission sidelobe energy causes interference called clutter interference (or clutter echo). This reflected transmission energy may clutter, distort, or disguise incoming transmissions from node N2.

In conventional operations, such as sub mm wave operations and frequencies, clutter interference is not usually the biggest cause of self-interference (e.g., reduced SINR). Usually, array leakage is the largest contributor of self-interference. However, in mm wave operations and frequencies, array leakage (e.g., direct leakage) has been found to be lower and clutter interference (e.g., echo or indirect interference) has been found to cause a significant or majority amount of self-interference. For example, the size of the antenna elements for mm wave frequency and directional nature of the mm wave operations reduces array leakage. Reducing and mitigating clutter interference is a key challenge in enabling full duplex operating in mm wave. One proposed technique for reducing clutter interference involves measuring interference at one node, reporting the measured interference to another node, and making a determination based on the measurements. Such "closed loop" clutter interference mitigation techniques may be suitable for certain conditions and utilize additional processing and signaling overhead. The open loop clutter interference mitigation techniques described herein involve device based and/or pattern based clutter interference mitigation. Thus, the open loop clutter interference mitigation techniques may enable clutter interference mitigation in more circumstances, with less resources (e.g., less signaling overhead), or a combination thereof.

Figure 4:
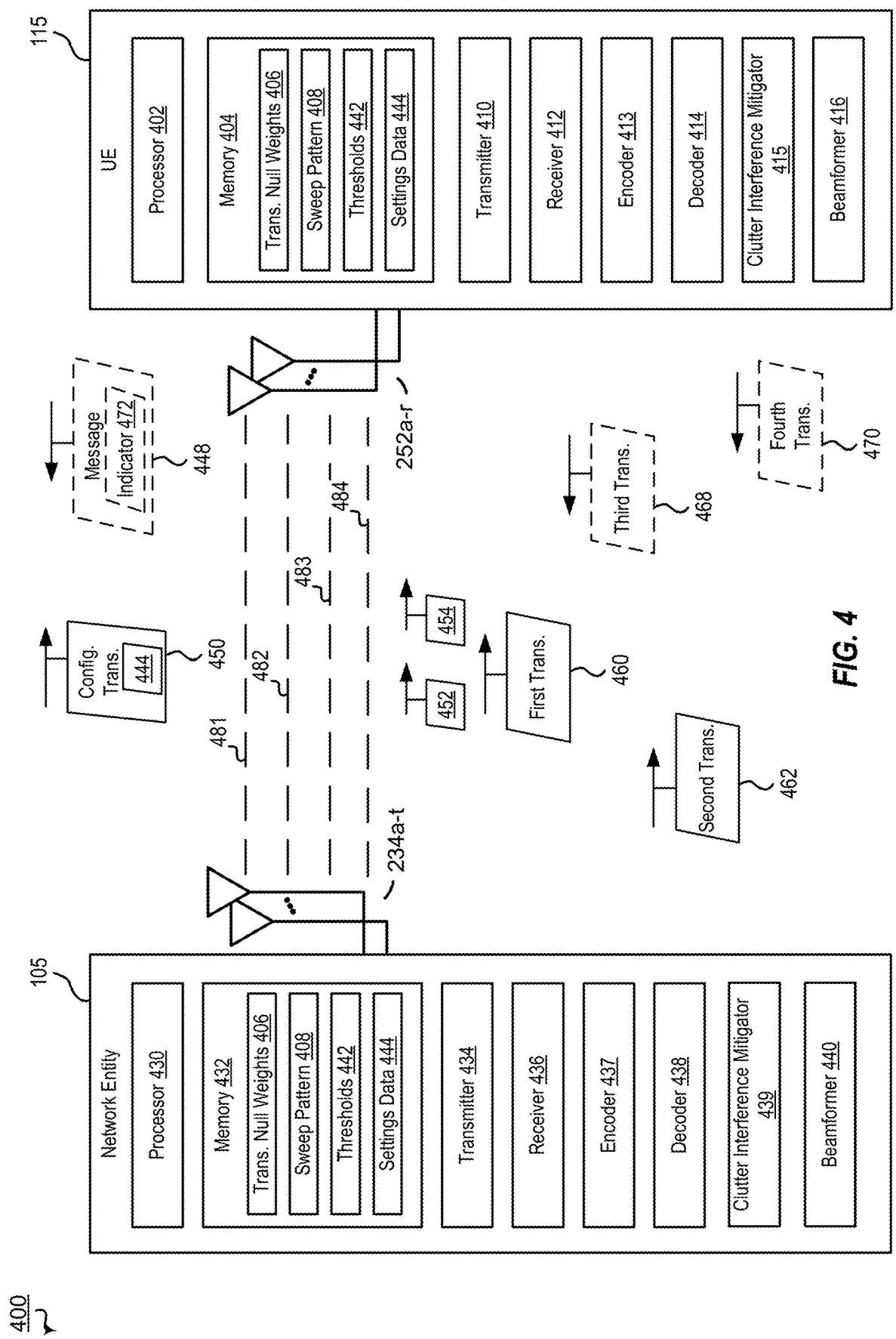
FIG. 4 is a block diagram illustrating an example of a wireless communications system that enables open loop clutter interference mitigation.

FIG. 4 illustrates an example of a wireless communications system 400 that supports open loop clutter interference mitigation operations. In some examples, wireless communications system 400 may implement aspects of wireless communication system 100. For example, wireless communications system 400 includes multiple wireless communication devices of wireless communication system 100. In the example illustrated in FIG. 4, the communications system 400 includes a first wireless communication device, network entity 105 (such as a network system or base station), and includes a second wireless communication device, UE 115. The network entity 105 may be operating in a full duplex mode. Optionally, the wireless communications system 400 includes additional wireless communication devices such as additional network entities and/or additional UEs. Open loop clutter interference mitigation operation may enable more efficient mm wave and/or full duplex operation and may increase reliability. Open loop clutter interference mitigation operation may reduce latency and overhead as compared to closed loop clutter interference mitigation operations.

Network entity 105 and UE 115 may be configured to communicate via frequency bands, such as FR1 having a frequency of 410 to 7125 MHz, FR2 having a frequency of 24250 to 52600 MHz for mm-Wave, or bands above FR2. In some implementations, the FR2 frequency bands may be limited to 52.6 GHz. While in some other implementations, the FR2 frequency bands may have a frequency of 300 GHz or more. It is noted that sub-carrier spacing (SCS) may be equal to 15, 30, 60, or 120 kHz for some data channels. Network entity 105 and UE 115 may be configured to communicate via one or more component carriers (CCs), such as representative first CC 481, second CC 482, third CC 483, and fourth CC 484. Although four CCs are shown, this is for illustration only, as more or fewer than four CCs may be used. One or more CCs may be used to communicate a Physical Downlink Control Channel (PDCCH), a Physical Downlink Shared Channel (PDSCH), a Physical Uplink Control Channel (PUCCH), a Physical Uplink Shared Channel (PUSCH), Physical Sidelink Control Channel (PSCCH), or a Physical Sidelink Shared Channel (PSSCH).

In some implementations, such transmissions may be scheduled by dynamic grants. In some other implementations, such transmissions may be scheduled by one or more periodic grants and may correspond to semi-persistent scheduling (SPS) grants or configured grants of the one or more periodic grants. The grants, both dynamic and periodic, may be preceded or indicated by a pre-grant transmission or a message with a UE identifier (UE-ID). In some implementations, the pre-grant transmission may include a UE-ID. The pre-grant transmission or UE-ID message may be configured to activate one or more UEs such that the UEs will transmit a first reference signal, listen/monitor for a second reference signal, or both. The pre-grant transmission or UE-ID message may be sent during a contention period, such as contention period 310, and initiate a contention procedure.

Each periodic grant may have a corresponding configuration, such as configuration parameters/settings. The periodic grant configuration may include SPS configurations and settings. Additionally, or alternatively, one or more periodic grants (such as SPS grants thereof) may have or be assigned to a CC ID, such as intended CC ID.

Each CC may have a corresponding configuration, such as configuration parameters/settings. The configuration may include bandwidth, bandwidth part, hybrid automatic repeat request (HARQ) process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC also may have corresponding management functionalities, such as, beam management, BWP switching functionality, or both. In some implementations, two or more CCs are quasi co-located, such that the CCs have the same beam or same symbol.

In some implementations, control information may be communicated via network entity 105 and UE 115. For example, the control information may be communicated suing MAC-CE transmissions, RRC transmissions, DCI, transmissions, another transmission, or a combination thereof.

UE 115 includes processor 402, memory 404, transmitter 410, receiver 412, encoder, 413, decoder 414, Clutter Interference Mitigator 415, Beamformer 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 also may be configured to store transmission null weight data 406, sweep pattern data 408, thresholds data 442, settings data 444, or a combination thereof, as further described herein.

Figure 5:
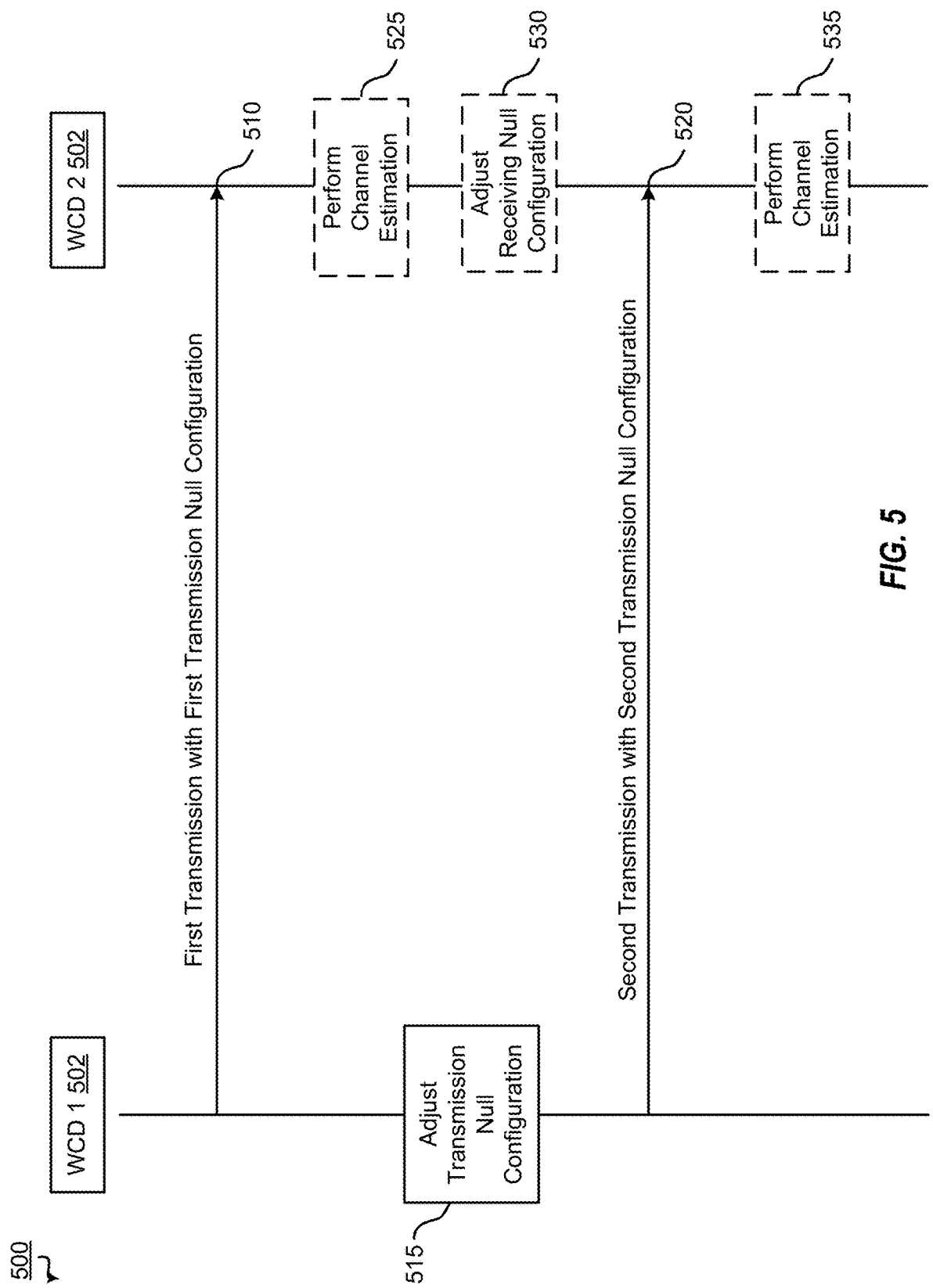
FIG. 5 is a ladder diagram illustrating an example of a process flow for a first example of open loop clutter interference mitigation.
Figure 6:
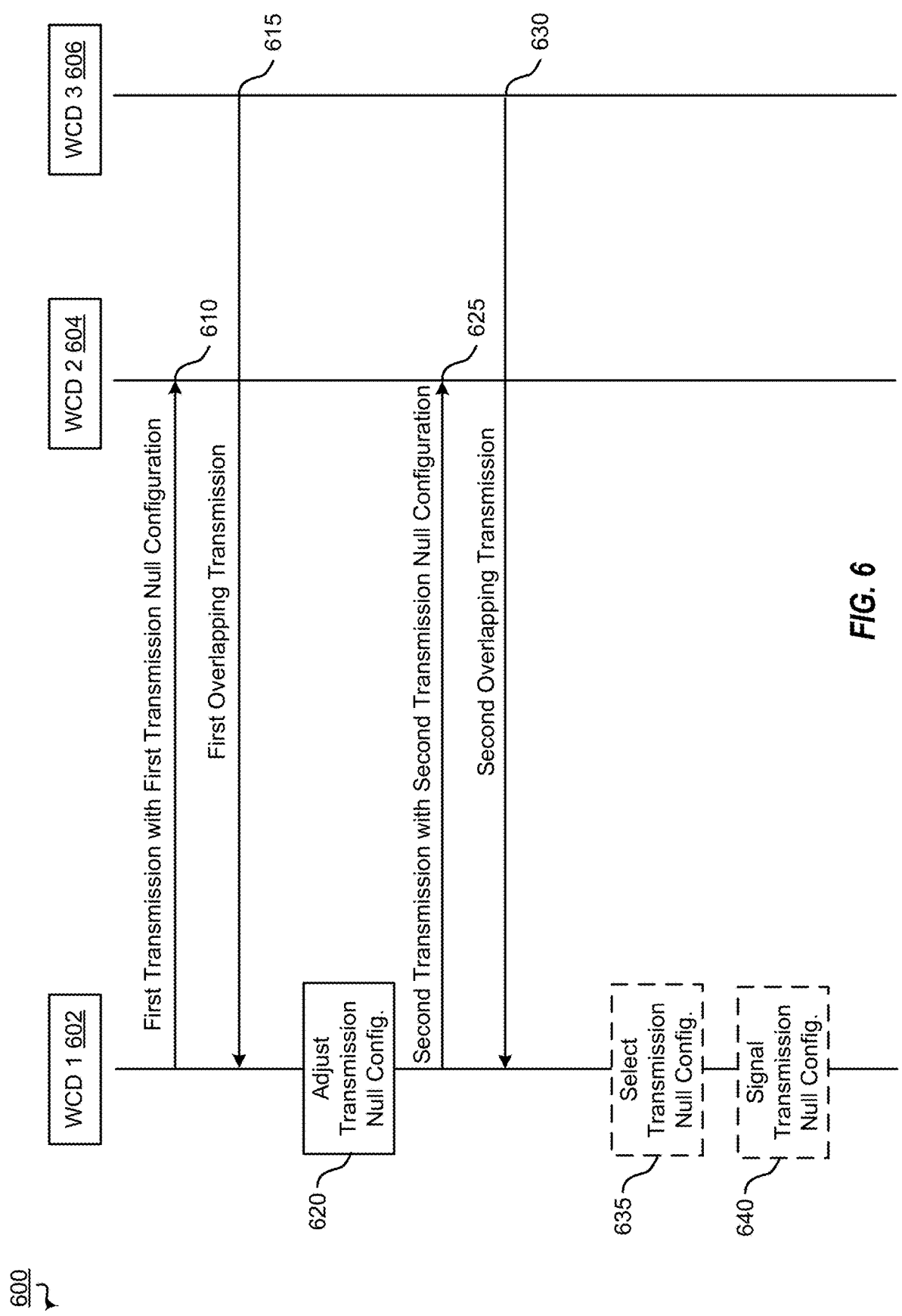
FIG. 6 is a ladder diagram illustrating an example of a process flow for a second example of open loop clutter interference mitigation.

The transmission null weights 406 includes or corresponds to data indicating beamforming values or weights configured to generate a particular transmission nulls, such as sidelobe transmission null in a particular directions, such as shown in FIGS. 5-7. The sweep pattern 408 includes or corresponds to a list or pattern of transmission nulls. For example, a particular sweep pattern may indicate to generate transmission nulls for successive transmissions and/or receptions in clockwise or counter-clockwise direction. To illustrate a first left most side lobe may have a transmission null for a first transmission and a second left most side lobe may have a transmission null for a second transmission.

The thresholds 442 includes or corresponds to one or more thresholds for open loop clutter interference mitigation. For example, the thresholds 442 may include thresholds for determining when to enable and/or disable clutter interference mitigation operations, when to select a particular transmission null for further use, etc., or a combination thereof. The settings data 444 includes or corresponds to data which is used by UE 115 to determine an open loop clutter interference mitigation operation mode, a particular transmission null or weight, a particular sweeping pattern, or other settings of open loop clutter interference mitigation operation.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode, such as encode or decode transmissions, respectively. Clutter Interference Mitigator 415 may be configured to determine a particular sweep pattern based on the sweep pattern 408 and determine a particular transmission null (e.g., sidelobe null) for a particular transmission. The Clutter Interference Mitigator 415 and/or beamformer 416 may be configured to generate transmission null weights 406 (e.g., beamforming weights) based on the determined/identified transmission null. Such transmission null forming and sweeping enables enhanced operation (e.g., enhanced full duplex operations) with reduced interference and reduces signaling overhead as compared to closed loop clutter interference mitigation operations.

Network entity 105 includes processor 430, memory 432, transmitter 434, receiver 436, encoder 437, decoder 438, Clutter Interference Mitigator 439, beamformer 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store transmission null weight data 406, sweep pattern data 408, thresholds data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entity 105 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entity 105 described with reference to FIG. 2. Encoder 437, and decoder 438 may include the same functionality as described with reference to encoder 413 and decoder 414, respectively. Clutter Interference Mitigator 439 may include similar functionality as described with reference to Clutter Interference Mitigator 415, and beamformer 440 may include similar functionality as described with reference to beamformer 416.

During operation of wireless communications system 400, network entity 105 may determine that UE 115 has open loop clutter interference mitigation operation capability. For example, UE 115 may transmit a message 448, such as a capabilities message, that includes an open loop clutter interference mitigation operation indicator 472. Indicator 472 may indicate open loop clutter interference mitigation operation capability or a particular type of open loop clutter interference mitigation operation, such as uplink, downlink, sidelink, or a combination thereof. In some implementations, network entity 105 sends control information to indicate to UE 115 that open loop clutter interference mitigation operations are to be used. For example, in some implementations, message 448 (or another message, such as a response or a trigger message) is transmitted by the network entity 105.

In the example of FIG. 4, network entity 105 transmits an optional configuration transmission 450. The configuration transmission 450 may include or indicate a open loop clutter interference mitigation operation configuration, such as settings data 444. The configuration transmission 450 (such as settings data 444 thereof) may indicate open loop clutter interference mitigation operation format, a sweep pattern, a slot configuration, Quasi-Colocation (QCL) information (e.g., QCL type information or determination assumptions), etc. Quasi-Colocation (QCL) is often referred to as or used interchangeably with Quasi-Colocated.

Two antenna ports are said to be quasi co-located if properties of the channel over which a symbol on one antenna port is conveyed can be inferred from the channel over which a symbol on the other antenna port is conveyed.

Two signals transmitted from same antenna port shall experience the same radio channel, whereas transmitting two signals from two different antenna ports shall experience different radio conditions. However, there can be some cases where transmitting signals from two different antenna ports experience radio channels having similar/common properties. For example, when the two antenna ports are part of the same antenna array (same TRP) or from two arrays that are located in close proximity, the two antenna ports may be QCL. In such cases the antenna ports said to be Quasi-Colocation (QCL), or Quasi-Colocated.

For example, signal 'A' and signal 'B' transmitted from Antenna Port #1 and Antenna Port #2 respectively. When processed at a receiver it is found the both signals experienced common radio channel properties, such as Doppler Spread. Then Antenna Port #1 and Antenna Port #2 may be referred to as Quasi-Colocation Antenna Ports and signal 'A' and 'B' said to be Quasi-Colocation Signals. There are different Types of QCL, such as QCL-Type A-QCL Type D, with varying amounts of shared/common parameters. QCL Type A includes the same Doppler shift, Doppler spread, average delay, and delay spread, QCL Type B includes the same Doppler shift and Doppler spread, QCL Type C includes the same Average delay and Doppler shift, and QCL Type D includes the same spatial receive (RX) parameter.

After transmission of the message 448, the configuration transmission 450 (such as a RRC message or a DCI), or both, open loop clutter interference mitigation operations may be established. As an illustrative example, network entity 105 identifies an aggregation of slots or subslots and indicates QCL information for at least one element of the aggregation of slots of subslots. The aggregation of slots or subslots may be explicitly signaled and the QCL information may be implicitly signaled or determined or inferred by a receiving device.

In the example of FIG. 4, the network entity 105 transmits an indication 452 and QCL information 454. The indication 452 may include or correspond to symbol configuration information for one or more transmission time intervals (TTIs). The symbol configuration information indicates one or more subsets of symbols of the one or more TTIs. Thus, the symbol configuration information may break up or configure a particular slot or TTI into multiple subslots, often referred to as minislots.

The QCL information 454 may indicate QCL indications for one or more subsets of the symbols of a particular TTI. For example, the QCL information 454 may indicate information for spatial direction channel gain, phase, delay, and Doppler. The QCL information 454 may not be explicitly signaled or transmitted, but rather inferred or assumed by the UE 115 based on configuration settings or prior signaling. The indication 452 and the QCL information 454 may be sent in the same transmissions or different transmissions.

During a particular TTI, the network entity 105 transmits a first transmission 460 to UE 115. The first transmission 460 is transmitted with a first transmission null. In some implementations, the network entity 105 receives a third transmission 468 (e.g., a reception) partially concurrently with the transmitting the first transmission 460.

During the particular TTI, the network entity 105 transmits a second transmission 462 to UE 115. The second transmission 460 is transmitted with a second transmission null different from the first transmission null. Because the second transmission is sent with a different transmission null, the network entity 105 receives different or reduced clutter reflections or feedback. This "randomized" clutter reflections and feedback/echo reduce the overall clutter interference received by the transmitting device. The particular TTI may include an aggregation of multiple slots or of sub slots. Additionally, the indication 452 and the QCL information 454 may be sent prior to or during the particular TTI.

The network entity 105 may continue to generate different transmission nulls to sweep the transmission null position and randomize and reduce clutter feedback. Additionally, or alternatively, the network entity 105 may select one or more transmissions null positions based on its own actions and/or determinations. For example, the network entity may sweep the transmission null position and test multiple (e.g., 6 positions). Based on the received clutter interference for or associated with each transmission null position, the network entity 105 may determine and select a subset of the transmission null positions for further use. To illustrate, the network entity 105 may calculate SINR for the incoming transmissions associated with each transmission null and may determine a best or highest average performance for one or more transmission null positions. The network entity 105 may use the subset of higher performing transmission null positions for future transmissions.

The network entity 105 may periodically update the used transmission nulls by sweeping (e.g., resweeping) the transmission nulls across more or all sidelobe positions. For example, the network entity 105 may update the transmissions nulls used based on time, movement, speed, change in surroundings, signal degradation, failed transmissions, failed receptions, or a combination thereof. To illustrate, the network entity 105 may determine that itself or the receiving device has experienced a change above a threshold of thresholds 442. In some such implementations, the receiving device (e.g., UE 115) may determine that it has experience a change above a threshold (e.g., change in position) and the receiving device (e.g., UE 115) may signal such a change to the transmitting device (e.g., the network entity 105) or may signal an indication to update the transmission nulls used (e.g., resweep).

In some implementations, the network entity 105 receives a fourth transmission 470 (e.g., a reception) partially concurrently with the transmitting the second transmission 462. In a particular implementation, the third transmission 468, the fourth transmission 470, or both, are received from the UE 115, such as in a full duplex mode. In other implementations, one or more of the third transmission 468 and the fourth transmission 470 are received from another device, such as in a half-duplex mode (e.g., half-duplex UEs).

In some implementations, one or more of the transmissions may include open loop clutter interference mitigation information. For example, the network entity 105 may indicate a slot aggregation of multiple transmission slots or of multiple mini slots of a single transmission slot.

Although TX based downlink examples have been illustrated in FIG. 4, additionally or alternatively, RX and/or uplink or sidelink based open loop clutter interference mitigation operations may be performed. For example, the network entity 105 may perform open loop clutter interference mitigation operations when receiving the third and fourth transmissions. To illustrate, the network entity 105 may sweep transmission nulls for reception beams (e.g., reception nulls) used to receive the third and fourth transmissions. An another example, the UE 115 may perform receiver side open loop clutter interference mitigation for the first and second transmissions. To illustrate, the UE 115 may sweep transmission nulls for reception beams (e.g., reception nulls) used to receive the first and second transmissions.

FIG. 5 is a ladder diagram illustrating an example of a process flow for an example of open loop clutter interference mitigation operations. Referring to FIG. 5, a process flow 500 is illustrated that supports open loop clutter interference mitigation in accordance with aspects of the present disclosure. In some examples, process flow 500 may implement aspects of a wireless communications system 100 or 400. For example, a network entity or entities and a UE may perform one or more of the processes described with reference to process flow 500. Wireless communication devices (e.g., network entities) may communicate with other wireless communication devices (e.g., UE 115) by transmitting and receiving signals through TRPs. Alternative examples of the following may be implemented, where some steps are performed in a different order than described or are not performed at all. In some cases, steps may include additional features not mentioned below, or further steps may be added.

At 510, a first wireless communication device 502 (e.g., a first gNB or a first TRP of a gNB) may transmit a first transmission with a first transmission null to a second wireless communication device 504 (e.g., a second gNB or a UE).

At 515, the first wireless communication device 502 may adjust transmission null weights. For example, the first wireless communication device 502 may determine a transmission null sweeping pattern and a next transmission null, such as position thereof or particular sidelobe to adjust. The first wireless communication device 502 may generate beamforming weights to reduce or eliminate energy of the sidelobe while maintaining a main direction of the beam. The first wireless communication device 502 adjust the beamforming weights to generate/adjust the transmission mull weights.

Figure 7B:
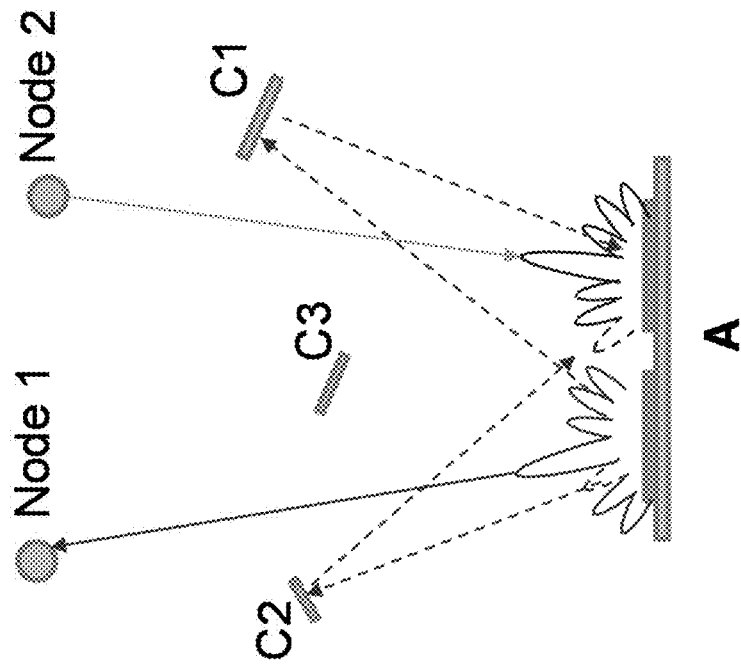
FIGS. 7A and 7B illustrate an example of transmission null sweeping
Figure 7A:
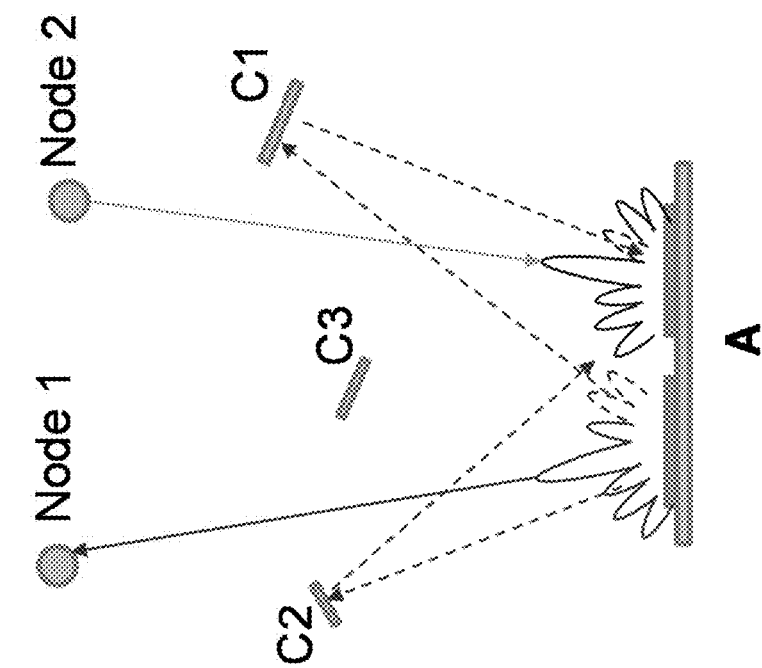

At 520, the first wireless communication device 502 may transmit a second transmission with a second transmission null to the second wireless communication device 504 where the second transmission null is different from the first transmission null, such as illustrated in FIGS. 7A and 7B.

When generating different transmission nulls and maintaining a direction of the beam (e.g., spatial direction or QCL Type D), a channel gain, phase, delay, and/or doppler spread of the beam may change. (e.g., not QCL Type A) to adjust the positions of the sidelobe transmission nulls. This beam information (e.g., QCL information) may be sent ahead of time, such as pre-stored or assumed by the receiving device. To illustrate, each device may know the sweep pattern and may generate the QCL information for each beam based on the sweep pattern. The sweep pattern may be pre-set or communicated prior to data transmission, such as on link establishment and/or by RRC. Alternatively, the transmitting device (e.g., the first wireless communication device 502) may signal or indicate the QCL information for each beam. For example, the QCL information may be signaled prior to the transmissions, such as in a DCI or PDCCH, scheduling the first transmission (e.g., a data transmission, such as a PDSCH) or may be included in the first transmission.

Additionally or alternatively, the transmitting device (e.g., the first wireless communication device 502) may include reference signal information in or with the first and/or second transmissions. For example, the transmitting device may signal or indicate DMRS information and/or PTRS information. To illustrate, the transmitting device may include a DMRS per port and/or include a PTRS per TRP. Transmission of such reference signal information may enable channel and/or noise estimation. As such first and second transmissions may correspond to multiple mini slots of the same slot, each of the first and second transmissions may include reference signal information to enable channel and/or noise estimation. The configuration for the mini slots may be configured by RRC, such as semi-static configuration that can be dynamically changed but applies to multiple transmissions. Additionally or alternatively, the slot configuration, such as which symbols are grouped together to form the mini slots may be enabled, disabled or configured by dynamic signaling before each transmissions. To illustrate, a DCI or PDSCH is used to activate/deactivate or indicate a slot configuration.

The first wireless communication device 502 may receive transmissions (e.g., receptions) at least partially concurrently with transmitting the first transmission and/or the second transmission. The received transmissions may come from another wireless communication device, such as in FIG. 5 when the second wireless communication device 504 is a half-duplex device or is operating in a half-duplex mode.

At 525, the second wireless communication device 504 may optionally perform channel estimation based on the first transmission. For example, the second wireless communication device 504 may perform channel estimation based on the QCL information associated with the first transmission. To illustrate, the QCL information is determined by the second wireless communication device 504 based on open loop clutter interference mitigation settings stored at the second wireless communication device 504 or based on QCL information transmitted with or accompanying the second transmission.

In some implementations, the second wireless communication device 504 may optionally perform receiver side open loop clutter interference mitigation. For example, at 525, the second wireless communication device 504 may optionally adjust transmission null weights for receiving the second transmission (e.g., reception null weights or receiving beamforming weights). To illustrate, the second wireless communication device 504 may determine a second transmission null sweeping pattern and a next transmission null, and the second wireless communication device 504 may adjust the transmission null as described with reference to 515. The second transmission null sweeping pattern may be the same as or different from the transmission null sweeping pattern of the first wireless communication device 502.

At 535, the second wireless communication device 504 may optionally perform channel estimation based on the second transmission. For example, the second wireless communication device 504 may perform channel estimation based on the second QCL information associated with the second transmission as described with reference to 525. Although the example of FIG. 5 illustrates channel estimation by the second wireless communication device 504, in other implementations, the first and/or second wireless communication devices 502, 504 may perform channel and/or noise estimation based on received transmissions.

FIG. 6 is a ladder diagram illustrating an example of a process flow for a second example of open loop clutter interference mitigation. Referring to FIG. 6, a process flow 600 is illustrated that supports open loop clutter interference mitigation in accordance with aspects of the present disclosure. As compared to FIG. 5, FIG. 6 illustrates an example of half-duplex operation. In some examples, process flow 600 may implement aspects of a wireless communications system 100 or 400. For example, a network entity or entities and a UE may perform one or more of the processes described with reference to process flow 500. Wireless communication devices (e.g., network entities) may communicate with other wireless communication devices (e.g., UE 115) by transmitting and receiving signals through TRPs. Alternative examples of the following may be implemented, where some steps are performed in a different order than described or are not performed at all. In some cases, steps may include additional features not mentioned below, or further steps may be added.

At 610, a first wireless communication device 502 (e.g., a first gNB or a first TRP of a gNB) may transmit a first transmission with a first transmission null to a second wireless communication device 604 (e.g., a second gNB or a UE).

At 615, a third wireless communication device 506 (e.g., a third gNB or another UE) may transmit a first overlapping transmission (e.g., overlapping with the first transmission) to the first wireless communication device 602.

At 620, the first wireless communication device 502 may adjust transmission null weights as described with reference to 515 of FIG. 5.

At 625, the first wireless communication device 502 may transmit a second transmission with a second transmission null to the second wireless communication device 504 where the second transmission null is different from the first transmission null, such as illustrated in FIGS. 7A and 7B.

At 630, the third wireless communication device 506 may transmit a second overlapping transmission (e.g., overlapping with the second transmission) to the first wireless communication device 602.

At 635, the first wireless communication device 502 may select a best or highest average performing transmission null. For example, the first wireless communication device 502 may select the first transmission null based on the first overlapping transmission having a better SINR than the second overlapping transmission. As an illustrative example, the first wireless communication device 502 may determine a first clutter interference value of the first transmission, determine a second clutter interference value of the second transmission, compare the first clutter interference value and the second clutter interference value, and in response to determining that the first clutter interference value indicates reduced clutter as compared to the second clutter interference value, transmit a third transmission with the first settings.

At 640, the first wireless communication device 502 may signal the transmission null to the second wireless communication device 604. For example, the first wireless communication device 602 may transmit a DCI message indicating the first transmission null or may transmit a third transmission with QCL information indicating the first transmission null.

The first wireless communication device 502 may determine to keep sweeping transmission nulls or to cease sweeping transmission nulls. For example, the first wireless communication device 502 may determine a clutter interference metric with respect to the first transmission and to transmit the second transmission response to determining that the clutter interference metric failed to satisfy a threshold. As another example, the first wireless communication device 502 may determine a second clutter interference metric with respect to the second transmission and determine not to adjust transmission weights in response to determining that the second clutter interference metric satisfied the threshold.

FIGS. 7A and 7B illustrate an example of transmission null sweeping. FIG. 7A illustrates an first transmission null and FIG. 7B illustrates a second and different transmission null. In FIG. 7A, the transmitting antenna generates a first transmission null that reduces or cancels clutter echo or feedback (clutter reflections) for object C1, such as reduces or cancels the generation of clutter reflections.

In FIG. 7B, the transmitting antenna generates a second transmission null that reduces or cancels clutter echo or feedback (clutter reflections) for object C2. As shown in FIGS. 7A and 7B, the receiving antenna may also form transmission nulls (e.g., reception nulls) in addition to or in the alternative of. In the examples shown in FIGS. 7A and 7B, the receiving antenna transmission nulls (e.g., reception nulls) also reduce or cancel the pickup of clutter reflections. As compared to FIG. 3B, FIGS. 7A and 7B illustrate half duplex operation.

Figures 8, 9:
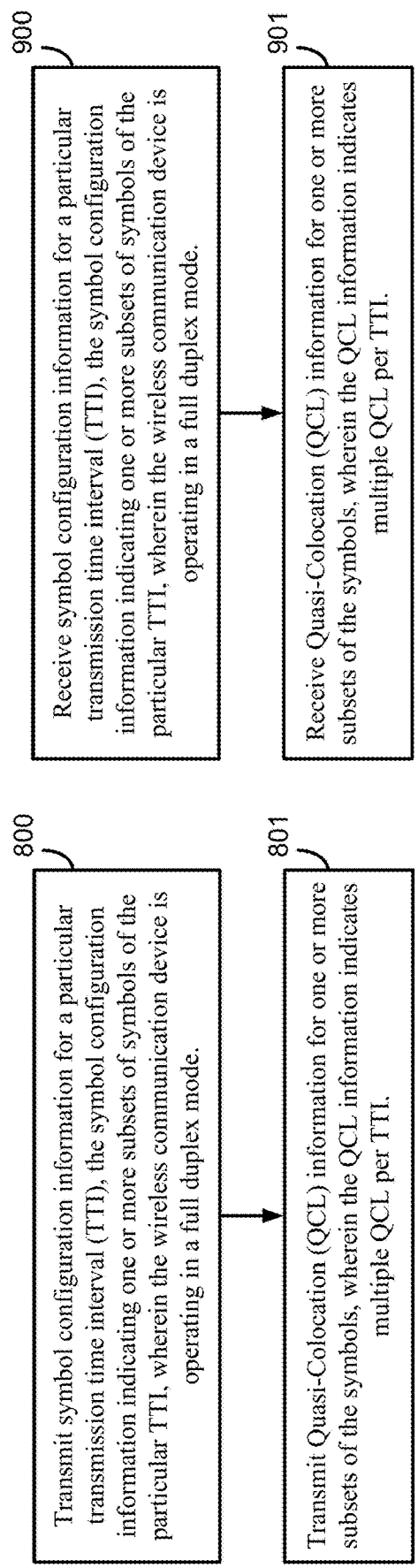
FIG. 8 is a block diagram illustrating example blocks executed by a UE.
FIG. 9 is a block diagram illustrating example blocks executed by a network entity.

FIG. 8 illustrates a first example method of wireless communication. At 800, a wireless communication device transmits symbol configuration information for a particular transmission time interval (TTI). The symbol configuration information indicates one or more subsets of symbols of the particular TTI, and the wireless communication device is operating in a full duplex mode.

At 801, a wireless communication device transmits Quasi-Colocation (QCL) information for one or more subsets of the symbols, where the QCL information indicates multiple QCL per TTI.

The wireless communication device (e.g., such as UE or base station) may execute additional blocks (or the wireless communication device may be configured further perform additional operations) in other implementations. For example, the UE 115 or the base station 105 may perform one or more operations described above. As another example, the UE 115 or the base station 105 may perform one or more aspects as presented below.

In a first aspect, the QCL information indicates a same spatial direction and a different null direction for the one or more subsets of symbols.

In a second aspect, alone or in combination with the first aspect, the symbol configuration information indicates the one or more subsets of symbols for a single TTI.

In a third aspect, alone or in combination with one or more of the above aspects, the symbol configuration information and the QCL information are sent in the same transmission or in different transmissions.

In a fourth aspect, alone or in combination with one or more of the above aspects, the QCL information is transmitted during the particular TTI or prior to the particular TTI.

In a fifth aspect, alone or in combination with one or more of the above aspects, the symbol configuration information indicates the one or more subsets of symbols for multiple TTIs including the particular TTI.

In a sixth aspect, alone or in combination with one or more of the above aspects, the QCL information is associated with transmitting using a first spatial configuration that has a first transmission null configuration for a first subset of symbols and is associated with transmitting using a second spatial configuration that has a second transmission null configuration for a second subset of symbols.

In a seventh aspect, alone or in combination with one or more of the above aspects, the transmission null is an intentional suppression of an array response in one or more particular directions, and wherein the wireless communication device is operating in a millimeter wave frequency range.

In an eighth aspect, alone or in combination with one or more of the above aspects, the wireless communication device further: transmits a first transmission for a first subset of symbols of the one or more subsets using a first spatial configuration that has a first transmission null configuration; adjusts transmission null configuration settings based on settings of the wireless communication device; and transmits a second transmission for a second subset of symbols of the one or more subsets using a second spatial configuration that has a second transmission null configuration different from the first transmission null configuration.

In a ninth aspect, alone or in combination with one or more of the above aspects, adjusting the transmission null configuration includes changing a position of a sidelobe transmission null with respect to a main lobe, and the transmission null comprises a sidelobe with reduced radiative energy.

In a tenth aspect, alone or in combination with one or more of the above aspects, the first transmission corresponds to a first slot and the second transmission corresponds to a second slot, and wherein the first transmission includes QCL information that indicates a QCL Type for a particular slot.

In an eleventh aspect, alone or in combination with one or more of the above aspects, the QCL information comprises a TCI state, a reference signal, or both, and wherein the reference signal comprises a demodulation reference signal (DMRS), and wherein the DMRS is per port.

In a twelfth aspect, alone or in combination with one or more of the above aspects, the QCL information comprises a TCI state, a reference signal, or both, and wherein the reference signal comprises a phase tracking reference signal (PTRS), and wherein the PTRS is per TRP.

In a thirteenth aspect, alone or in combination with one or more of the above aspects, the first transmission corresponds to a first sub-slot of a particular slot and the second transmission corresponds to a second sub-slot of the particular slot, and wherein the first transmission and the second transmission are each associated with a QCL indicator for their respective sub-slots.

In a fourteenth aspect, alone or in combination with one or more of the above aspects, a first QCL associated with the first transmission has a same spatial direction as a second QCL associated with the second transmission.

In a fifteenth aspect, alone or in combination with one or more of the above aspects, the wireless communication device further determines a clutter interference metric with respect to the first transmission, and where transmitting the second transmission is performed in response to determining that the clutter interference metric failed to satisfy a threshold.

In a sixteenth aspect, alone or in combination with one or more of the above aspects, the wireless communication device further: determines a second clutter interference metric with respect to the second transmission; determines not to adjust transmission weights in response to determining that the second clutter interference metric satisfied the threshold; and transmits a third transmission with the second transmission null configuration.

In a seventeenth aspect, alone or in combination with one or more of the above aspects, the wireless communication device further: determines a first clutter interference value of the first transmission; determines a second clutter interference value of the second transmission; compares the first clutter interference value and the second clutter interference value; and in response to determining that the first clutter interference value indicates reduced clutter as compared to the second clutter interference value, transmits a third transmission with the first transmission null configuration.

In an eighteenth aspect, alone or in combination with one or more of the above aspects, the wireless communication device further receives a third transmission at least partially concurrently with transmitting the first or second transmission.

In a nineteenth aspect, alone or in combination with one or more of the above aspects, the first transmission is sent to a first node and the third transmission is received from the first node or a second node.

In a twentieth aspect, alone or in combination with one or more of the above aspects, the wireless communication deice further performs open loop receive beam sidelobe null forming for a third transmission and a fourth transmission, where the third transmission is received at the wireless device at least partially concurrently with a first transmission, and where the fourth transmission is received at the wireless device at least partially concurrently with a second transmission.

In a twenty-first aspect, alone or in combination with one or more of the above aspects, performing open loop receive beam sidelobe null forming includes: sweeping a receive beam sidelobe null in a same pattern as transmission sidelobe null formation; sweeping a receive beam sidelobe in a different pattern as transmission sidelobe null formation; or sweeping a receive beam sidelobe such that each combination of transmission and receive sidelobe nulls is tested.

In a twenty-second aspect, alone or in combination with one or more of the above aspects, the wireless communication deice further transmits a message indicating that a receiving device is to perform receive beam sidelobe null forming.

Accordingly, wireless communication devices may perform open loop clutter interference mitigation operations. By performing open loop clutter interference mitigation operations interference and signal failures are reduced, and thus throughput may be increased and latency may be reduced.

FIG. 9 illustrates a second example method of wireless communication. At 900, a wireless communication device receives symbol configuration information for a particular transmission time interval (TTI). The symbol configuration information indicates one or more subsets of symbols of the particular TTI, and the wireless communication device is operating in a full duplex mode.

At 901, a wireless communication device receives Quasi-Colocation (QCL) information for one or more subsets of the symbols, where the QCL information indicates multiple QCL per TTI. For example, the wireless communication device may assume particular QCL information for the one or more subsets. To illustrate, the wireless communication device may receive a QCL indicator for the TTI and assume that spatial configuration is the same for each subset of symbols and may assume that a channel gain configuration, a phase configuration, a delay configuration, a Doppler spread configuration, a Doppler shift configuration, or a combination thereof, are different for one or more subsets.

The wireless communication device (e.g., such as UE or base station) may execute additional blocks (or the wireless communication device may be configured further perform additional operations) in other implementations. For example, the UE 115 or the base station 105 may perform one or more operations described above. As another example, the UE 115 or the base station 105 may perform one or more aspects as described with reference to FIG. 8. As yet another example, the UE 115 or the base station 105 may perform one or more aspects as presented below.

In a first aspect, inferring one or more QCL indications based on the QCL information, the QCL indications include a same spatial configuration, a different channel gain, a different phase, a different delay, a different Doppler spread, a different Doppler shift, or a combination thereof, for the one or more subsets.

In a second aspect, alone or in combination with the first aspect, the QCL information (e.g., QCL indicator) is configured to enable performing channel estimation, noise estimation, or both, per sub-slot. In some implementations, the channel estimation and/or noise estimation is performed based on the QCL information (e.g., QCL indicator) for each subset of symbols.

In a third aspect, alone or in combination with one or more of the above aspects, the wireless communication device is further configured to initiate open loop clutter mitigation operation or disable open loop clutter mitigation based on a downlink control information (DCI) transmission, hybrid automatic repeat request (HARQ) feedback, a channel state information (CSI) report, or a combination thereof.

In a fourth aspect, alone or in combination with one or more of the above aspects, the symbol configuration information is transmitted via a radio resource control (RRC) message or a downlink control information (DCI) transmission and indicates a sub-slot configuration.

In a fifth aspect, alone or in combination with one or more of the above aspects, the wireless communication device further receives a message indicating that wireless communication device is to perform receive beam sidelobe null forming.

Accordingly, wireless communication devices may perform open loop clutter interference mitigation operations. By performing open loop clutter interference mitigation operations interference and signal failures are reduced, and thus throughput may be increased and latency may be reduced.

FIG. 10 illustrates a third example method of wireless communication. At 1000, a wireless communication device transmits a first transmission for a first subset of symbols of the one or more subsets using a first spatial configuration that has a first transmission null configuration;

At 1001, a wireless communication device adjusts transmission null configuration settings based on settings of the wireless communication device. For example, the settings may include a predetermined or prestored transmission null weight sweeping pattern. Adjusting a transmission null configuration may include reducing a radiative energy of one or more side lobe beams and not adjusting a direction of a main lobe beam, may include includes changing (e.g., sweeping) a position of a sidelobe transmission null with respect to a main lobe direction, or both. The transmission null may correspond to sidelobe with reduced radiative energy.

At 1002, a wireless communication device transmits a second transmission for a second subset of symbols of the one or more subsets using a second spatial configuration that has a second transmission null configuration different from the first transmission null configuration The wireless communication device may additionally or alternatively, adjust a transmission null configuration (e.g., beamforming weights or transmission null weights) to sweep a transmission null, based on open loop sweeping techniques, to move a sidelobe transmission null randomly or pseudo randomly, to move a sidelobe transmission null independent of feedback or measurement information from another device, or a combination thereof.

The wireless communication device (e.g., such as UE or base station) may execute additional blocks (or the wireless communication device may be configured further perform additional operations) in other implementations. For example, the UE 115 or the base station 105 may perform one or more operations described above. As another example, the UE 115 or the base station 105 may perform one or more aspects as described with reference to FIGS. 8 and 9.

FIG. 11 illustrates a fourth example method of wireless communication. At 1100, a wireless communication device receives a first transmission for a first subset of symbols of the one or more subsets using a first spatial configuration that has a first transmission null configuration.

At 1101, a wireless communication device receives a second transmission for a second subset of symbols of the one or more subsets using a second spatial configuration that has a second transmission null configuration different from the first transmission null configuration.

The wireless communication device (e.g., such as UE or base station) may execute additional blocks (or the wireless communication device may be configured further perform additional operations) in other implementations. For example, the UE 115 or the base station 105 may perform one or more operations described above. As another example, the UE 115 or the base station 105 may perform one or more aspects as described with reference to FIGS. 8-10.

Accordingly, wireless communication devices may perform open loop clutter interference mitigation operations. By performing open loop clutter interference mitigation operations interference and signal failures are reduced, and thus throughput may be increased and latency may be reduced.

In other aspects, a method of wireless communication may include identifying one or more subslots or sets of symbols of a least one slot and indicating QCL information for at least one subslot or set of symbols of the one or more subslots.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to open loop clutter interference mitigation may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 8 and 9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   transmitting, by a wireless communication device, symbol configuration information for a particular transmission time interval (TTI), the symbol configuration information indicating one or more subsets of symbols of the particular TTI, wherein the wireless communication device is operating in a full duplex mode; and
   transmitting, by the wireless communication device, Quasi-Colocation (QCL) information for one or more subsets of the symbols, wherein the QCL information indicates spatial direction information and transmission null direction information and further indicates multiple QCL per TTI.

2. The method of claim 1, wherein the QCL information indicates a same spatial direction and a different null direction for the one or more subsets of symbols.

3. The method of claim 1, wherein the symbol configuration information indicates the one or more subsets of symbols for a single TTI.

4. The method of claim 1, wherein the symbol configuration information and the QCL information are sent in the same transmission or in different transmissions.

5. The method of claim 1, wherein the QCL information is transmitted during the particular TTI or prior to the particular TTI.

6. The method of claim 1, wherein the symbol configuration information indicates the one or more subsets of symbols for multiple TTIs including the particular TTI.

7. The method of claim 1, wherein the QCL information is associated with transmitting using a first spatial configuration that has a first transmission null configuration for a first subset of symbols and is associated with transmitting using a second spatial configuration that has a second transmission null configuration for a second subset of symbols.

8. The method of claim 7, wherein a transmission null is an intentional suppression of an array response in one or more particular directions, and wherein the wireless communication device is operating in a millimeter wave frequency range.

9. An apparatus configured for wireless communication, comprising:
   at least one processor; and
   a memory coupled to the at least one processor,
   wherein the at least one processor is configured to:
      transmit, by a wireless communication device, symbol configuration information for a particular transmission time interval (TTI), the symbol configuration information indicating one or more subsets of symbols of the particular TTI, wherein the wireless communication device is operating in a full duplex mode; and transmit, by the wireless communication device, Quasi-Colocation (QCL) information for one or more subsets of the symbols, wherein the QCL information indicates spatial direction information and transmission null direction information and further indicates multiple QCL per TTI.

10. The apparatus of claim 9, wherein the processor is further configured to:
transmitting, by the wireless communication device, a first transmission for a first subset of symbols of the one or more subsets using a first spatial configuration that has a first transmission null configuration;
adjusting, by the wireless communication device, transmission null configuration settings based on settings of the wireless communication device; and
transmitting, by the wireless communication device, a second transmission for a second subset of symbols of the one or more subsets using a second spatial configuration that has a second transmission null configuration different from the first transmission null configuration.

11. The apparatus of claim 10, wherein adjusting the transmission null configuration settings includes changing a position of a sidelobe transmission null with respect to a main lobe, wherein the sidelobe transmission null comprises a sidelobe with reduced radiative energy.

12. The apparatus of claim 10, wherein the first transmission corresponds to a first slot and the second transmission corresponds to a second slot, and wherein the first transmission includes QCL information that indicates a QCL Type for a particular slot.

13. The apparatus of claim 10, wherein the QCL information comprises a transmission configuration indicator (TCI) state, a reference signal, or both, wherein the reference signal comprises a demodulation reference signal (DMRS), and wherein the DMRS is per port.

14. The apparatus of claim 10, wherein the QCL information comprises a transmission configuration indicator (TCI) state, a reference signal, or both, wherein the reference signal comprises a phase tracking reference signal (PTRS), and wherein the PTRS is per TRP.

15. The apparatus of claim 10, wherein the first transmission corresponds to a first sub-slot of a particular slot and the second transmission corresponds to a second sub-slot of the particular slot, and wherein the first transmission and the second transmission are each associated with a QCL indicator for their respective sub-slots.

16. The apparatus of claim 10, wherein a first QCL associated with the first transmission has a same spatial direction as a second QCL associated with the second transmission.

17. The apparatus of claim 10, further comprising determining a clutter interference metric with respect to the first transmission, wherein transmitting the second transmission is performed in response to determining that the clutter interference metric failed to satisfy a threshold.

18. The apparatus of claim 17, further comprising:
determining a second clutter interference metric with respect to the second transmission;
determining not to adjust transmission weights in response to determining that the second clutter interference metric satisfied the threshold; and
transmitting a third transmission with the second transmission null configuration.

19. The apparatus of claim 10, further comprising:
determining a first clutter interference value of the first transmission;
determining a second clutter interference value of the second transmission;
comparing the first clutter interference value and the second clutter interference value; and
in response to determining that the first clutter interference value indicates reduced clutter as compared to the second clutter interference value, transmitting a third transmission with the first transmission null configuration.

20. The apparatus of claim 10, further comprising receiving a third transmission at least partially concurrently with transmitting the first or second transmission, and wherein the first transmission is sent to a first node and the third transmission is received from the first node or a second node.

21. The apparatus of claim 9, further comprising performing, by the wireless communication device, open loop receive beam sidelobe null forming for a third transmission and a fourth transmission, wherein the third transmission is received at the wireless communication device at least partially concurrently with a first transmission, and wherein the fourth transmission is received at the wireless communication device at least partially concurrently with a second transmission.

22. The apparatus of claim 21, wherein performing open loop receive beam sidelobe null forming includes:
sweeping a receive beam sidelobe null in a same pattern as transmission sidelobe null formation;
sweeping a receive beam sidelobe in a different pattern as transmission sidelobe null formation; or
sweeping a receive beam sidelobe such that each combination of transmission and receive sidelobe nulls is tested.

23. A method of wireless communication comprising:
receiving, by a wireless communication device, symbol configuration information for a particular transmission time interval (TTI), the symbol configuration information indicating one or more subsets of symbols of the particular TTI, wherein the wireless communication device is operating in a full duplex mode; and
receiving, by the wireless communication device, Quasi-Colocation (QCL) information for one or more subsets of the symbols, wherein the QCL information indicates spatial direction information and transmission null direction information and further indicates multiple QCL per TTI.

24. The method of claim 23, further comprising inferring one or more QCL indications based on the QCL information, wherein the QCL indications include a same spatial configuration, a different channel gain, a different phase, a different delay, a different Doppler spread, a different Doppler shift, or a combination thereof, for the one or more subsets.

25. The method of claim 23, wherein the QCL information is configured to enable performing channel estimation, noise estimation, or both, per sub-slot.

26. The method of claim 23, further comprising initiating open loop clutter mitigation operation or disabling open loop clutter mitigation based on a downlink control information (DCI) transmission, hybrid automatic repeat request (HARD) feedback, a channel state information (CSI) report, or a combination thereof.

27. An apparatus configured for wireless communication, comprising:
at least one processor; and
a memory coupled to the at least one processor,
wherein the at least one processor is configured to:

receive, by a wireless communication device, symbol configuration information for a particular transmission time interval (TTI), the symbol configuration information indicating one or more subsets of symbols of the particular TTI, wherein the wireless communication device is operating in a full duplex mode; and receive, by the wireless communication device, Quasi-Colocation (QCL) information for one or more subsets of the symbols, wherein the QCL information indicates spatial direction information and transmission null direction information and further indicates multiple QCL per TTI.

28. The apparatus of claim 27, wherein the symbol configuration information is transmitted via a radio resource control (RRC) message or a downlink control information (DCI) transmission and indicates a sub-slot configuration, and wherein the wireless communication device is a user equipment (UE).

29. The apparatus of claim 27, wherein the processor is further configured to receive, by the wireless communication device, a message indicating that the wireless communication device is to perform receive beam sidelobe null forming.

* * * * *